(12) United States Patent
Arnold

(10) Patent No.: US 12,428,054 B2
(45) Date of Patent: Sep. 30, 2025

(54) METHOD AND DEVICE FOR OBTAINING DATA RELATING TO ROAD CONDITIONS

(71) Applicant: Kevin Arnold, Pfronstetten-Aichelau (DE)

(72) Inventor: Kevin Arnold, Pfronstetten-Aichelau (DE)

( * ) Notice: Subject to any disclaimer, the term of this patent is extended or adjusted under 35 U.S.C. 154(b) by 73 days.

(21) Appl. No.: 18/290,037

(22) PCT Filed: Apr. 29, 2022

(86) PCT No.: PCT/EP2022/061510
§ 371 (c)(1),
(2) Date: Nov. 9, 2023

(87) PCT Pub. No.: WO2022/248159
PCT Pub. Date: Dec. 1, 2022

(65) Prior Publication Data
US 2024/0239405 A1 Jul. 18, 2024

(30) Foreign Application Priority Data

May 28, 2021 (DE) ...................... 10 2021 113 835.3

(51) Int. Cl.
B62D 6/00 (2006.01)
B60W 40/068 (2012.01)
B62D 5/04 (2006.01)

(52) U.S. Cl.
CPC ............. *B62D 6/00* (2013.01); *B60W 40/068* (2013.01); *B62D 5/046* (2013.01)

(58) Field of Classification Search
None
See application file for complete search history.

(56) References Cited

U.S. PATENT DOCUMENTS

| | | | | |
|---|---|---|---|---|
| 6,952,635 B2 * | 10/2005 | Yasui | ...................... | B62D 6/006 180/197 |
| 7,792,619 B2 * | 9/2010 | Uryu | ..................... | B62D 5/0484 180/443 |
| 8,418,801 B2 * | 4/2013 | Izutani | ................. | B62D 5/0481 180/446 |
| 8,666,604 B2 * | 3/2014 | Fehlings | .............. | B62D 5/0481 701/41 |
| 9,108,668 B2 * | 8/2015 | Kunihiro | ................ | B62D 5/046 |
| 9,550,523 B2 * | 1/2017 | George | ................. | B62D 6/006 |
| 10,286,953 B2 * | 5/2019 | Lavoie | ................... | B62D 1/286 |
| 11,511,790 B2 * | 11/2022 | George | ................ | B60W 50/16 |
| 11,952,012 B2 * | 4/2024 | Lee | ......................... | G06V 20/58 |
| 2002/0017422 A1 * | 2/2002 | Kim | ......................... | B60T 8/32 180/446 |
| 2004/0148077 A1 * | 7/2004 | Yasui | .................. | B60W 40/101 701/41 |
| 2005/0205344 A1 * | 9/2005 | Uryu | ..................... | B62D 5/046 180/446 |
| 2011/0251759 A1 * | 10/2011 | Mack | ....................... | B60T 8/172 701/41 |
| 2012/0029774 A1 * | 2/2012 | Fehlings | ............... | B62D 5/0481 701/42 |
| 2012/0205187 A1 * | 8/2012 | Izutani | ................... | B62D 5/046 180/446 |
| 2013/0197757 A1 * | 8/2013 | Ellis | ........................ | B62D 6/007 701/41 |
| 2013/0226412 A1 * | 8/2013 | Kunihiro | .............. | B62D 5/0481 701/42 |
| 2015/0367884 A1 * | 12/2015 | George | ................. | B60W 30/02 701/41 |
| 2016/0075369 A1 * | 3/2016 | Lavoie | ................. | B62D 5/0463 180/446 |
| 2019/0225268 A1 * | 7/2019 | Lavoie | ...................... | B62D 6/00 |
| 2020/0262468 A1 * | 8/2020 | George | ............... | B60W 50/16 |
| 2021/0046971 A1 * | 2/2021 | Bae | ......................... | B60L 50/61 |
| 2022/0410927 A1 * | 12/2022 | Lee | ................... | B60W 60/0051 |
| 2023/0139711 A1 * | 5/2023 | Keßler | ................. | B62D 5/0481 701/41 |
| 2023/0294731 A1 * | 9/2023 | Kudo | .............. | B60W 30/18009 701/23 |
| 2024/0239405 A1 * | 7/2024 | Arnold | ................ | B60W 40/068 |
| 2024/0383529 A1 * | 11/2024 | Fasth | ..................... | B62D 6/006 |

FOREIGN PATENT DOCUMENTS

| | | | | |
|---|---|---|---|---|
| CN | 105197015 A | * | 12/2015 | .......... B60W 40/068 |
| CN | 105197015 B | * | 11/2018 | ............ B60W 30/02 |
| CN | 111572548 A | * | 8/2020 | .......... B60W 40/068 |
| CN | 113264104 A | * | 8/2021 | ............... B62D 6/00 |
| CN | 113928412 A | * | 1/2022 | ............... B62D 6/00 |
| CN | 113928412 B | * | 8/2022 | ............... B62D 6/00 |
| CN | 111572548 B | * | 6/2023 | ........... B62D 5/0463 |
| CN | 117980220 A | * | 5/2024 | .............. B62D 6/008 |
| CN | 117985098 A | * | 5/2024 | ............... B62D 6/00 |
| DE | 103 53 246 A1 | | 6/2004 | |
| DE | 102006053029 A1 | * | 5/2008 | ............. B62D 6/002 |
| DE | 4419317 B4 | * | 9/2008 | ......... B60G 17/0195 |
| DE | 20 2009 007 324 U1 | | 10/2010 | |
| DE | 102010014564 A1 | * | 10/2011 | ............... B60T 8/172 |
| DE | 102018205904 A1 | * | 10/2019 | ............ B60W 10/20 |
| DE | 10 2018 208 216 A1 | | 11/2019 | |
| DE | 102020104265 A1 | * | 8/2020 | .......... B60W 40/068 |
| DE | 112019003489 T5 | * | 4/2021 | ............ B62D 5/0463 |
| DE | 102021113835 A1 | * | 12/2022 | ............ B60W 40/06 |
| DE | 102020104265 B4 | * | 3/2024 | .......... B60W 40/068 |
| EP | 1407950 A1 | * | 4/2004 | ............. B62D 6/006 |
| EP | 1407950 B1 | * | 3/2005 | ............. B62D 6/006 |
| EP | 2489575 A2 | * | 8/2012 | ............. B62D 5/046 |

(Continued)

OTHER PUBLICATIONS

PCT—Written Opinion of the International Searching Authority of International Application No. PCT/EP2022/061510 dated Aug. 5, 2022.

(Continued)

*Primary Examiner* — Kevin R Steckbauer
(74) *Attorney, Agent, or Firm* — Collard & Roe, P.C.

(57) ABSTRACT

A method and a device for obtaining data relating to road conditions for vehicles with a steering motor or motors, wherein the power consumption of the steering motor or motors is measured during vehicle operation, and the power consumption data are transmitted to a driver assistance system and/or stored on a storage medium.

9 Claims, No Drawings

(56) References Cited

FOREIGN PATENT DOCUMENTS

| | | | | |
|---|---|---|---|---|
| EP | 2489575 B1 | * | 12/2014 | ........... B62D 5/0481 |
| EP | 2960137 A1 | * | 12/2015 | ............. B62D 6/006 |
| EP | 2960137 B1 | * | 8/2017 | ............. B60W 10/20 |
| ES | 2288894 T3 | * | 2/2008 | ................ B60L 3/04 |
| JP | 4322450 B2 | * | 9/2009 | ........... B62D 5/0466 |
| JP | 2021127077 A | * | 9/2021 | ............... B62D 6/00 |
| JP | 2023135487 A | * | 9/2023 | .......... B60W 60/001 |
| JP | 7412209 B2 | * | 1/2024 | ............. B62D 5/046 |
| WO | 2010/046200 A1 | | 4/2010 | |
| WO | WO-2020215659 A1 | * | 10/2020 | ............... B62D 6/00 |
| WO | WO-2022248159 A1 | * | 12/2022 | ............ B60W 40/06 |

OTHER PUBLICATIONS

International Search Report of PCT/EP2022/061510, dated Aug. 5, 2022.
German Office Action dated Mar. 15, 2022 in German Application No. 10 2021 113 835.3, with English translation.

* cited by examiner

METHOD AND DEVICE FOR OBTAINING DATA RELATING TO ROAD CONDITIONS

CROSS REFERENCE TO RELATED APPLICATIONS

This application is the National Stage of PCT/EP2022/061510 filed on Apr. 29, 2022, which claims priority under 35 U.S.C. § 119 of German Application No. 10 2021 113 835.3 filed on May 28, 2021, the disclosure of which is incorporated by reference. The international application under PCT article 21(2) was not published in English.

Increasing the safety of a vehicle represents an important goal in the development of vehicles. Modern vehicles are therefore equipped with driver assistance systems (FAS or, in English: ADAS=Advanced Driver Assistance System), which intervene, in a partially autonomous or an autonomous manner, in the drive system (e.g. gas, brake), the steering (e.g. parking/steering assistant) or in signaling devices of the vehicle, so as to keep the vehicle on the road or at least to warn the driver about hazardous situations.

In newer vehicles, the driver assistance systems have not only automatic steering but at least also an ABS and an EPS system, which counteract locking of the wheels during braking as well as under-steering or over-steering of the vehicle when turning a curve. For this purpose, brake pressure sensors, steering angle sensors, wheel speed of rotation sensors, gyro rate sensors and yaw rate sensors are provided, which transmit their signals to computers of the driver assistance system, which evaluate the signals and, if the signals deviate from reference values, trigger an intervention in the vehicle drive (gas and brake) and/or the vehicle control, i.e., the steering motors.

Furthermore, a more extensive surroundings sensor system can be provided in the driver assistance system, with which the distance of the vehicle from objects can be detected by means of cameras, radar and lidar devices and/or ultrasound devices.

However, the road conditions, which have a significant influence on driving safety, have only been recognized insufficiently and/or with delays until now. Using a camera, only relatively rough statements concerning road conditions can be made. Yaw rate sensors measure the effect of a specific road condition on vehicle behavior only together with other influences such as wind or load and only in a time-delayed form. It is not possible, using these sensors, to detect a change in the road conditions before this change expresses itself in a change in the vehicle stability as a whole.

The invention is based on the task of making available a possibility with which a road condition or a change in the condition of the road can be detected directly and without a time delay.

This task is accomplished by means of a method for obtaining data relating to road conditions, for vehicles having steering motors, which method is characterized in that the power consumption of the steering motor or steering motors is measured during operation of the vehicle, and the power consumption data are transmitted to a driver assistance system and/or stored in memory on a memory medium.

The power consumption of the steering motors is dependent, among other things, on the friction between the tires and the road surface. If the road condition changes while driving on a curve, this change immediately expresses itself in a deviating power consumption of the steering motors. An icy spot on the road leads to lower power consumption, while loose chips or contaminants on the road result in increased power consumption.

Also, holes and cracks in the road surface can be detected by way of change in the power consumption of the steering motors.

In this regard, the changes in the power consumption take place directly, as soon as the steered wheels make contact with a different, changing road surface. There is no time delay caused by detection of secondary effects by sensors, such as swerving of the vehicle or the like. This rapid and constant detection of the road conditions therefore makes increased driving safety possible, in particular at higher speeds. Warning signals and/or interventions of the driver assistance system can occur more quickly and with greater accuracy.

Preferably, the driver assistance system can eliminate components caused solely by the speed and the steering angle of the vehicle from the power consumption data, and can assign the resulting difference in power consumption data to specific road properties. Also other components, such as the vehicle weight and the tire condition, which also influence the power consumption of the steering motors, but are independent of the state of the road surface, can be filtered out from the power consumption measurement data, so as to be able to undertake a precise assignment of the difference in power consumption data to specific road conditions by means of the driver assistance system. Even driving errors can be recognized, filtered out if desired, and/or recorded. The recorded data can be passed on, if necessary, to further processing and/or linking with other data.

The assignment of the difference in power consumption data to diverse road conditions can be improved by means of a self-learning system, as the vehicle travels an increasing number of kilometers. In this regard, camera signals of the driver assistance system can also be used for categorizing the difference in power consumption data according to road conditions.

Depending on the road condition that has been recognized, the driver assistance system can undertake corresponding interventions in the drive and the steering of the vehicle, so as to prevent under-steering or over-steering of the vehicle and to keep the vehicle safely on the road. These interventions can take place rapidly and in a very targeted manner. In this way, it is possible to travel on curves with greater adaptation and/or more quickly than has been the case with previous sensor systems, if the driver wants to drive in a more sporty manner. The interventions in braking, acceleration and steering of the vehicle furthermore take place only as long as they are actually necessary on the basis of the road conditions, and only to the required degree so that the vehicle can be safely steered through the curve, without having to provide a greater safety cushion, in particular with regard to speed.

If, in this regard, measuring the power consumption of the steering motors takes place at intervals of milliseconds and/or microseconds, it is ensured that every change in condition of the road is detected immediately, and, if necessary, an intervention in the drive and the steering of the vehicle is undertaken and/or the driver can be warned.

Preferably, the data of the power consumption are detected and/or stored in memory at time intervals of 100 microseconds or at intervals between 100 and 200 microseconds. The faster the detection of the changing values of the power consumption of the steering motor or motors takes place, the more precisely and exactly the related road surface condition data can be determined and/or indicated.

Furthermore, it is practical to also measure the steering angle of the vehicle. Changes in the steering angle also lead to a change in the power consumption of the steering motors, independent of the road conditions. The influences of the steering angle on the measured data can therefore already be eliminated before the measured data are passed on to the driver assistance system or stored in memory. Alternatively, measuring the steering angle and eliminating its influence on the power consumption can also be performed by the driver assistance system.

Further advantages occur if micro-steering movements are generated by the steering motor or motors, so that power consumption data can be generated even during travel straight ahead. During travel straight ahead, the steering motors do not consume any power. Therefore no statement regarding changes in the road conditions based on a change in the power consumption can be made on a straight roadway. However, in order to be able to monitor the road conditions without any gaps and even before the start of any travel on a curve, these micro-movements, which are not felt by the driver, are able to generate the required power consumption data. These micro-movements can also be advantageous during travel on a curve, in particular during extended travel on a curve, during which the steering angle of the vehicle is not changed over an extended period of time.

Furthermore, it is practical to also measure the torque of the steering motor or motors and to compare it with the power consumption data, and to carry out a plausibility check of the power consumption data with the torque data. If turning of the wheels is prevented by a curbstone, for example, greater power consumption occurs in the steering motors, which is not caused by the road conditions. However, in this case the torque of the steering motors is zero. In such a case, passing the power consumption measurement data on to a driver assistance system or intervention of the system in the drive and/or the steering of the vehicle, or storing the data in memory can be prevented or undertaken in a corrected form.

However, the method according to the invention can be used not only for control of vehicles. The power consumption data stored on the memory medium can also be transmitted to driver assistance systems of other vehicles, to a vehicle simulator and/or to a computer game. Transmission to other vehicles can also take place wirelessly and preferably already in a processed form, i.e., without influences of parameters other than the road conditions on the power consumption data. The data can also already be transmitted categorized according to road conditions, such as dry, wet, snow, ice, tar, gravel, ice with loose chips, ice on tar coating, etc. Furthermore, it is possible to also transmit the interventions in the vehicle drive and its steering that are required for vehicle safety under specific road conditions on to other vehicles.

The method can be used for detecting the road conditions of a racetrack, for example, and/or of road segments with heavy traffic, for example for driving school operations, precisely by way of power consumption measurements, and passing these on to a simulator or to a computer game. In this way, a much more realistic impression can be produced during virtual driving on this racetrack and also under different weather conditions.

The invention furthermore relates to an apparatus for obtaining data regarding road conditions in vehicles having steering motors, which apparatus is characterized by a power consumption measurement device for the steering motor or motors, an evaluation unit for the power consumption data, an interface for connecting to a driver assistance system and/or a memory unit.

This apparatus can be provided in new vehicles or retrofitted on existing vehicles. The evaluation device can undertake lesser or greater processing of the measure data, before these are passed on to a driver assistance system and/or stored in memory. By means of a change in the programming of the driver assistance system, the power consumption data can be evaluated together with other sensor data and, if applicable, interventions in the acceleration, the brake and/or the steering of the vehicle can be undertaken. Furthermore, acoustical and/or optical signals can be generated, which inform the driver about the road conditions.

Furthermore, it is advantageous if the apparatus has a measurement device for the steering angle of the vehicle. In this way, the influence of the steering angle on the power consumption of the steering motors can be filtered out by the evaluation unit.

If the apparatus furthermore has a torque measurement device for the steering motor or motors, which is connected to the evaluation unit, a plausibility check of the power consumption data can be carried out by the evaluation unit and, if applicable, passing the power consumption data on to the vehicle assistance system and/or storing them in memory can be suppressed.

The apparatus can furthermore have a control unit for the steering motor or motors, to generate micro-steering movements of the vehicle, so that during driving operation, particularly during travel straight ahead or on extended curves, measured data of the power consumption can be generated, which provide information about the road conditions.

If the memory unit of the apparatus furthermore has a removable memory medium, the apparatus can also be used to detect the road conditions of a racetrack, for example, and/or of selected road segments, and to transmit this information to a vehicle simulator, for example for driving school operations, or to a computer game.

It is understood that the apparatus according to the invention can also be an integral part of a vehicle assistance system.

Both the method according to the invention and the apparatus according to the invention improve the safety of driver-steered or autonomously or partially autonomously operated vehicles, in that they permit the inclusion of the road conditions in the driving operation of a driven vehicle. The maximum permissible speed at which a vehicle can travel on a specific, constantly changing road surface can be determined more reliably, and traffic safety can thereby be increased. Control and actuator mechanisms of a vehicle can be improved.

Road surface disruptions, for example caused by oil on the road, local black ice, obstacles, can be passed on to following vehicles on the same road. This increases safety overall, and vehicles having meaningful, up-to-date information about road conditions to be expected can either decide to change their route or to adapt their driving to changing road conditions in a timely manner.

Steering motors within the scope of the invention are understood to be servomotors on steering columns, steering gears, and steering motors (steer by wire).

The invention claimed is:

1. A method for obtaining data relating to road conditions, for vehicles having steering motors, comprising measuring the power consumption of the steering motor or motors during operation of the vehicle, and transmitting power consumption data to a driver assistance system and/or storing the power consumption data in memory in a memory medium, wherein torque of the steering motor or motors is measured and compared with the power consumption data, and a plausibility check of the power consumption data with the torque data is carried out.

2. The method according to claim 1, wherein measuring the power consumption of the steering motor or motors takes place at intervals of milliseconds and/or microseconds.

3. The method according to claim 1, wherein a steering angle of the vehicle is also measured.

4. The method according to claim 1, wherein micro-steering movements are generated by way of the steering motor or motors, so that power consumption data can be generated during driving operation, including during straight-ahead driving.

5. The method according to claim 1, wherein the power consumption data stored in the memory medium are transferred/transmitted to vehicle control and monitoring systems of other vehicles, to a vehicle simulator and/or to a computer game.

6. An apparatus for obtaining data relating to road conditions in vehicles having steering motors, comprising a power consumption measurement device configured for the steering motor or motors, an evaluation unit configured for evaluating the power consumption data, an interface configured for connecting to a vehicle control and monitoring system and/or a memory unit, and a torque measurement device configured for measuring torque of the steering motor or motors, which torque measuring device is connected to the evaluation unit, wherein the evaluation unit is configured to compare the torque measured by the torque measurement device with the power consumption data and carry out a plausibility check of the power consumption data with the torque data.

7. The apparatus according to claim 6, wherein the apparatus has a measurement device configured for measuring a steering angle of the vehicle.

8. The apparatus according to claim 6, wherein the apparatus a control unit configured for controlling the steering motor or motors, to generate micro-steering movements of the vehicle.

9. The apparatus according to claim 6, wherein the memory unit has a removable memory medium.

* * * * *